(12) United States Patent
Rosenblum

(10) Patent No.: US 8,005,611 B2
(45) Date of Patent: Aug. 23, 2011

(54) SYSTEMS AND METHODS FOR PROVIDING TOURIST INFORMATION BASED ON A LOCATION

(76) Inventor: Alan J. Rosenblum, Evanston, IL (US)

(*) Notice: Subject to any disclaimer, the term of this patent is extended or adjusted under 35 U.S.C. 154(b) by 930 days.

(21) Appl. No.: 11/831,569

(22) Filed: Jul. 31, 2007

(65) Prior Publication Data

US 2009/0036145 A1   Feb. 5, 2009

(51) Int. Cl.
*G01C 21/00* (2006.01)
(52) U.S. Cl. .................................................. 701/206
(58) Field of Classification Search .......... 701/200–202, 701/206–209, 213, 223; 340/991, 995.17, 340/995.23, 995.24, 995.28
See application file for complete search history.

(56) References Cited

U.S. PATENT DOCUMENTS

| | | | |
|---|---|---|---|
| 6,028,514 | A | 2/2000 | Lemelson |
| 6,505,046 | B1 | 1/2003 | Baker |
| 2002/0011951 | A1 | 1/2002 | Pepin et al. |
| 2005/0001743 | A1 | 1/2005 | Haemerle |
| 2007/0219706 | A1* | 9/2007 | Sheynblat ..................... 701/200 |
| 2008/0268876 | A1* | 10/2008 | Gelfand et al. ............... 455/457 |

* cited by examiner

*Primary Examiner* — Kim T Nguyen
(74) *Attorney, Agent, or Firm* — Schiff Hardin LLP

(57) ABSTRACT

A system for identifying and retrieving information about a point of interest comprises a portable device capable of determining the location of the point of interest and including a communication mechanism to communicate the same with a processing center. The system specifically identifies the point of interest, obtains relevant sources of information about the point of interest and reconciles the information. Furthermore, the system either transmits textual, graphical, audio or video to the portable device or facilitates communication between a user of the portable device and a call center or guide.

22 Claims, 3 Drawing Sheets

SYSTEMS AND METHODS FOR PROVIDING TOURIST INFORMATION BASED ON A LOCATION

BACKGROUND

1. Field of the Invention

The present invention generally relates to information communication systems and more particularly to systems which identify points of interest and transmit tourist information based on an identified location.

2. Description of the Related Art

With the advent of user accessible information storage systems as well as portable communication devices, individuals have an unprecedented ability to search for and retrieve information about any topic. For example, individuals routinely search for and retrieve information about points of interest when they visit unfamiliar cities. In addition, advancements in technology have provided individuals with the ability to determine their specific location or position in the world. This position information technology, such as, for example, global positioning system ("GPS"), allows individuals to determine theirs or others' location at any time.

Currently, individuals use such position information to locate destinations, receive guided directions, or track their location relative to another person or a place. For example, current systems allow individuals to use in-dash or portable GPS navigators to track the location of an object such as a car, or determine how far they are from a restaurant. Furthermore, individuals utilize position information to receive general information about an area. Specifically, individuals retrieve information about shopping or dining in their vicinity or generally within a section of a city.

Unfortunately, however, due to the shear number of accessible information storage systems, i.e., information sources, source providers and the sheer volume of information itself, it has become difficult to find the most relevant source. Typically, individuals rely on a familiar source such as a familiar database and a familiar website or spend time to screen multiple sources to find the desired information. For example, if a tourist wanted to find information about the Eiffel Tower, he or she may rely on a portable media with information about monuments or may search the internet. However, at times, individuals may not know the subject of their query itself. For example, a tourist visiting a foreign city may not know the identity of an interesting edifice or other location such as a garden, bridge, etc. Even if the tourist is lucky enough to identify the edifice after a general search, the information source may not be comprehensive or accurate. As a result, individuals must currently identify points of interest ahead of time, conduct their own search and determine the most appropriate resource for the desired information. This requires forethought as well as a considerable expenditure of time and effort.

Consequently, there is a need for a system that can provide specific and comprehensive information about a particular object based on its position in the world.

SUMMARY

Generally, the invention comprises a system including a portable device which determines the location of a point of interest, identifies the point of interest using the location information and retrieves information about the point of interest for a user.

An object of an embodiment of the present invention is to provide a system which allows a user to identify any point of interest.

Another object of an embodiment of the present invention is to instantaneously retrieve information about points of interest.

These objects are achieved in accordance with an exemplary embodiment of the invention by utilizing systems and methods which particularly identify a specific point of interest, query the appropriate information resource and instantaneously provide the information to an individual. More particularly, the preferred exemplary embodiment of the invention comprises a portable device which determines the location of a point of interest. The portable device transmits the position information, i.e., the location of the point of interest, to a processing center or an information source. In the preferred exemplary embodiment, the processing center or information source is used to identify the point of interest, obtain and reconcile information about the point of interest and automatically transmit the reconciled information to the portable device as well as a tour plan with directions to other similar points of interest.

To accomplish the foregoing and related ends, the preferred exemplary embodiment of the invention comprises the features herein fully disclosed. The following description and the figures are illustrative of embodiments of the invention. They are indicative of a few of the various ways in which the principles of the invention may be employed and a person of ordinary skill in the art would know that they are not limited as such. Other objects, advantages and novel features of the invention will become apparent from the following detailed description of the invention as well as the drawings.

DETAILED DESCRIPTION

Figure 1:
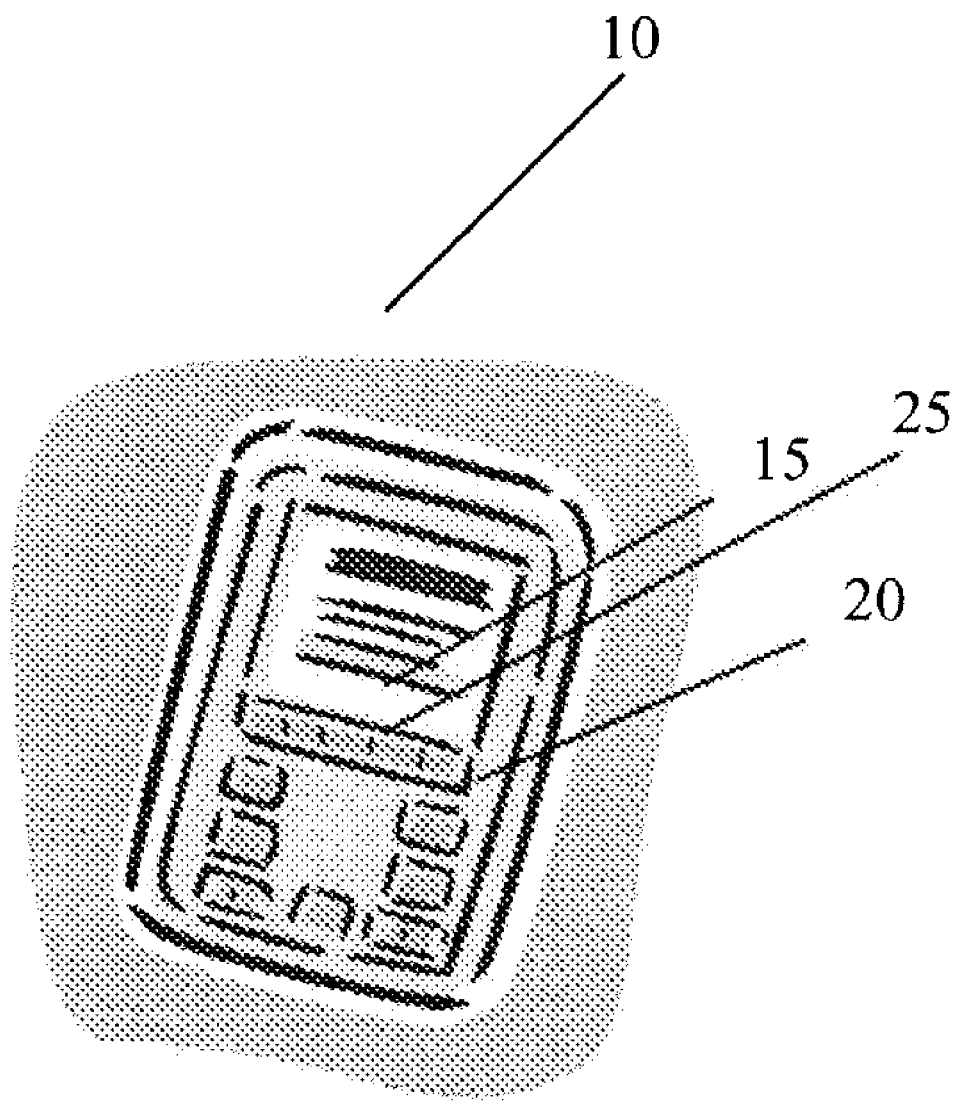
FIG. 1 is a pictorial illustration showing the portable device in a preferred embodiment.
Figure 2:
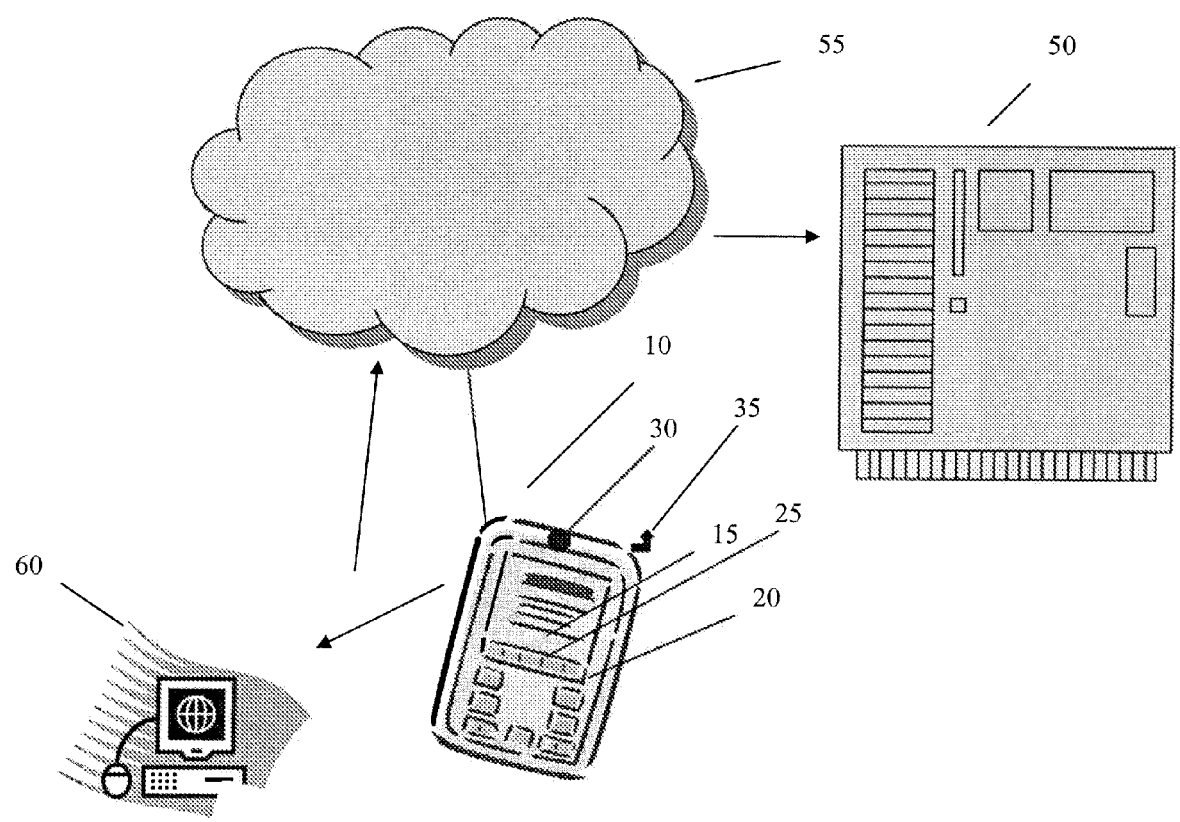
FIG. 2 is a pictorial illustration showing the portable device with an image capture mechanism.

In a preferred embodiment, referring to FIG. 1, the user points the portable device 10 at a point of interest such as, for example, an edifice. The position identification mechanism 15 of the portable device 10 determines the exact location of the point of interest. The portable device 10 communicates the location of the point of interest to a processing center 50 (FIG. 2). The processing center 50 identifies not only the point of interest but also other information about the point of interest such as its name, address, historical account, tenants or other information of interest to a tourist. The processing center 50 communicates the identity of the point of interest and/or the information about the point of interest to the portable device 10. In another exemplary embodiment, the processing center 50 further provides a tour plan to the portable device 10 based on information about the identified point of interest. The exemplary manner in which the foregoing is accomplished is further discussed below.

In an embodiment of the invention, the system provides information about a point of interest based on its identified location. A point of interest may be any structure, location or object that is of interest to an individual. Referring now to FIG. 1, this embodiment comprises a portable device 10. The portable device 10 comprises a position identification mechanism 15. Preferably, the position identification mechanism 15 comprises a global positioning system 20 and a laser distance measurer 25. The global positioning system 20 and laser measurer 25 work in conjunction to identify the specific location of a point of interest. More specifically, the portable device 10 is directed toward a point of interest, such as, for example, a monument. The laser measurer 25 measures the distance between the point of interest and the portable device 10. The global positioning system 20 utilizes the position information of the portable device 10 and the distance to the point of interest to determine the exact location or position of the point of interest.

It should be noted that a person of ordinary skill in the art would appreciate that the position identification mechanism 15 may comprise other mechanisms for determining the exact position of the point of interest. For example, the position identification mechanism 15 may utilize cellular information, satellite information or other methods to determine the location of the portable device 10 or the point of interest. Additionally, it should be appreciated by those of ordinary skill in the art that other types of distance measurers such as, for example, sonar systems, may be utilized by the position identification mechanism 15.

Moreover, it should also be appreciated that an approximation algorithm or other such method may be utilized to determine the location of the point of interest. For example, the position identification mechanism 15 may identify the location of the portable device 10 and approximate the position of the point of interest using an approximation of the portable device's distance to the point of interest and information about the general direction of the point of interest relative to the portable device 10. Additionally, the position identification mechanism 15 may identify the location of numerous points of interest within an approximate distance to the portable device 10 in various directions. In this instance, the portable device 10 may display an identifier, such as, for example an outline or a picture, of the various points of interest and allow the user to choose the desired one. In addition, the portable device's general location may be established by recalling its immediate prior location or based on previous queries. Alternatively, the position identification mechanism 15 may identify various points of interest in the direction that the portable device 10 is directed towards.

Turning now to FIG. 2, in another embodiment of the present invention, the portable device 10 comprises an image capture mechanism 30, including, but not limited to, a camera 30 which captures the image or defining characteristics of a point of interest. The location of the point of interest or its identity may then be identified using the visual characteristics of the point of interest. For example, the visual defining characteristics of the Sears Tower in Chicago may be compared to the material captured by the portable device 10 to identify the structure.

In a preferred exemplary embodiment of the invention, the portable device 10 includes a communication mechanism 35 to transmit the calculated position information to a processing center 50. A processing center 50 may simply be a computer, a database, a data warehouse facility, or a search engine. It should be noted that the portable device 10 may alternatively communicate with a communications network 55 such as, for example, the Internet, LAN or WAN, or a local terminal 60. In the preferred exemplary embodiment, the processing center utilizes the transmitted position information and queries information sources, either local or remote, about points of interest associated with the position or location. If more than one point of interest is associated with the determined position, the processing center preferentially identifies points of interest that are most frequently queried. Alternatively, if more than one point of interest is identified, the processing center may also note the multiple points of interest and allow an individual to select a desired one. The processing center further queries any information sources to obtain information about the identified points of interest. It should be appreciated by those of ordinary skill in the art that the processing center preferentially treats information sources. For example, information about objects in the processing center's databases is given precedence over the same information obtained from other sources. It should be appreciated by those of ordinary skill in the art that any desirable preferential scheme, e.g. based on quality of source, language preference, reputation of source, etc., may be utilized. In the preferred exemplary embodiment of the invention, the processing center reconciles the information about the object from the preferred sources. Thereafter, the processing center appropriately packages the reconciled information and transmits or communicates the same to the portable device 10. However, it should be appreciated by those of ordinary skill in the art that the information may be sent to a user to another device such as a separate PDA, cellular phone, pager or email account.

Figure 3:
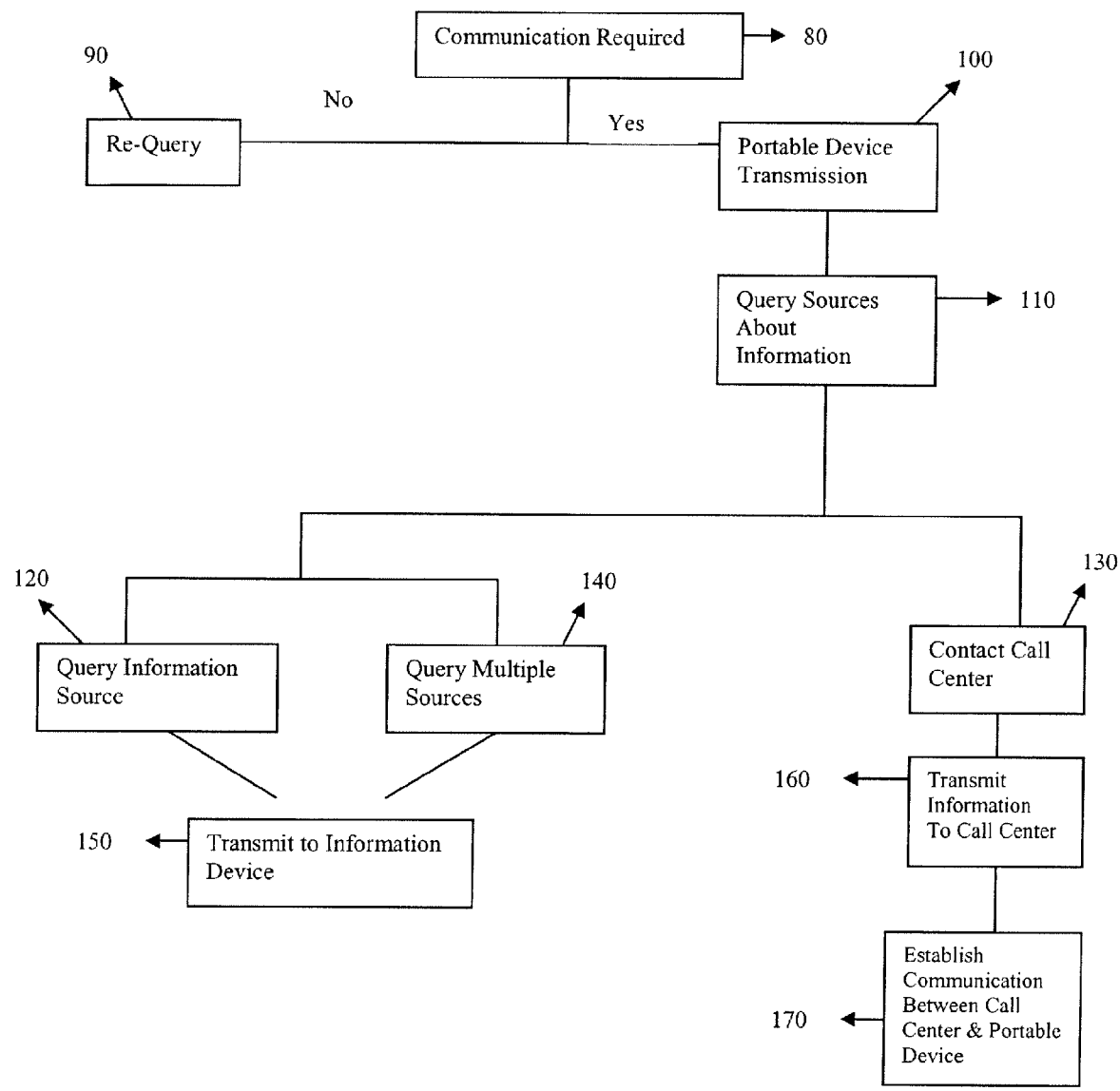
FIG. 3 is a flowchart of the query process of an embodiment of the present invention.

Turning now to FIG. 3, in an exemplary embodiment, the method for querying information comprises in step 80 processing center 50 automatically running a process to determine whether communication with the portable device 10 is required. If no communication is necessary such as when the portable device 10 is shut down or if the processing center is in a non-communicative mode, the processing center 50 loops back to re-query at step 90 at desired intervals or in any other desirable manner. If communication is appropriate, the portable device 10 transmits the determined position information along with either its unique identifier or an attached unique message identifier in step 100. The portable device's 10 unique identifier may allow the processing center 50 to associate the device with an individual, based on information previously entered. Consequently, the query may be associated with the individual's past queries that have been stored in the database of the processing center 50 or a stored profile of the individual. An individual's statistical analysis of usage, a machine learning process or other types of modeling can be used to personalize the results of a query to a user. In the next step 110, sources about points of interest associated with the position information are queried. Either an information source is queried 120 or a call center may be contacted 130. If one or more points of interests are identified, information sources, which may receive preferential treatment based on the query, are used to obtain information about the identified points of interest. If information is obtained from multiple sources, it may be reconciled or aggregated to provide comprehensive data in step 140. Thereafter, either the raw tourist information or tourist information personalized to the user is transmitted to the portable device 10 in step 150.

It will be appreciated by those of ordinary skill in the art that advertising or marketing material may be provided with the tourist information. In fact, marketing databases or marketing relationships may influence which points of interests are also presented. Finally, a personalized itinerary, either based on the user's information or based on the queried point of interest's relationship to other points of interest, may be created. For example, if the identity or information about a museum is queried, the preferred exemplary embodiment of the invention also provides a personalized tour along with directions and schedules for transportation. Furthermore, a personalized itinerary of events and directions may also be set forth to the user. Simultaneously, the same information may be shared with hotels, travel agencies, area travel services or live assistants. As a result, value-added services may be attached and provided to a user.

As seen in FIG. 3, during the query stage, a call center may be queried rather than an information source in step 130. In this alternate embodiment, position information and a query is transmitted to the call center 160 and a communication link is established between the portable device user and the call center 170.

In another preferred exemplary embodiment of the invention, the processing center receives position information from the portable device 10. The processing center determines the region associated with the position information and queries whether there is a cell center or guide associated with the determined region. Additionally, the processing center queries information sources about objects associated with the position information. If a call center or guide is associated with a region or another call center or guide is identified in a support function for the region, the processing center transmits the position information and query results about the associated objects to the call center or guide.

Finally, the processing center assists in establishing a communication between the call center and the portable device 10 or a user.

Significantly, the processing center can transmit textual, graphical, audio or video information to the portable device 10 or the user. The type of information transmitted may be based on the user's preferences, the recipient device's capabilities or the characteristics of the communication link. Preferably, the transmitted information identifies the object, provides statistical or historical information about the object and includes information about related objects or other objects of similar significance in the region.

In the other exemplary embodiment, the user is contacted by the call center or guide either over a cellular phone or via video conference. A person or ordinary skill in the art would appreciate that various types of devices or communications networks may be utilized to facilitate communications. In this exemplary embodiment, the user may communicate with the call center or guide in the same manner as if participating in a live tour.

Although modifications and changes may be suggested by those skilled in the art, it is the intention of the inventor to embody within the patent warranted hereon all changes and modifications as reasonably and properly come within the scope of his contribution to the art.

I claim:

1. A system for communicating tourist information, comprising:
    a portable device having a position identification mechanism and a communications mechanism, wherein the portable device communicates its position information and a distance between the portable device and a point of interest to a processing center; and
    the processing center, wherein the processing center identifies the point of interest, obtains information about the point of interest and communicates the identity of the point of interest and the obtained information to a user.

2. A system as in claim 1, wherein the position identification mechanism comprises a global positioning system and a distance measurer, and further wherein the position identification mechanism determines the position of the point of interest and the processing center identifies the point of interest based on the determined position of the point of interest.

3. A system as in claim 2, wherein the communications mechanism comprises a wireless communication device.

4. A system as in claim 3, wherein the portable device further comprises a display.

5. A system as in claim 1, wherein the portable device further comprises an image capture device, and further wherein the processing center identifies the point of interest based on information obtained by the image capture device.

6. A system as in claim 1, wherein the processing center further performs a query to identify at least a second point of interest that shares predetermined characteristics with the point of interest.

7. A system as in claim 1, wherein the processing center further performs a query to identify at least a second point of interest based on the obtained information about the point of interest.

8. A system as in claim 7, wherein the processing center further obtains information about the second point of interest, calculates a travel route between the point of interest and the second point of interest, and communicates the obtained information about the second point of interest and the travel route to the user.

9. A system as in claim 1, wherein information about the point of interest includes a description of the point of interest, a function of the point of interest, and the obtained information about accessing the point of interest.

10. A system for communicating tourist information, comprising:
    a portable device having a position identification mechanism, a communications mechanism and a display, wherein the position identification mechanism comprises a distance measurer to measure a distance between a first point of interest and the portable device and calculates a position of the first point of interest based on the measured distance and a general direction of the point of interest relative to the portable device and further wherein the portable device identifies the first point of interest based on the calculated position of the first point of interest; and
    a processing center, wherein the processing center queries at least one information source about the first point of interest, queries the information source to identify a second point of interest similar to the first point of interest, obtains directions from the first point of interest to the second point of interest and communicates results of the queries and the directions to a user.

11. A system as in claim 10, wherein the portable device further includes a storage device comprising an identity of at least a point of interest.

12. A system of claim 11, wherein the processing center further queries a call center and facilitates communication between the call center and the user.

13. A system as in claim 11, wherein the processing center further identifies advertising information and communicates the advertising information to the user.

14. A method for communicating tourist information, comprising:
    measuring a distance between a portable device and a point of interest using the portable device and determining a direction of the point of interest relative to the portable device using the portable device;
    calculating a position of the point of interest based on the distance and the direction of the point of interest relative to the portable device, the calculation being performed by one of the portable device and a computer device;
    identifying the point of interest based on the calculated position;
    identifying information about the point of interest; and
    transmitting the identified information about the point of interest to a user for display to the user on the portable device.

15. A method as in claim 14, further comprising:
capturing visual characteristics of the point of interest using the portable device and identifying the point of interest based on the calculated position and the visual characteristics.

16. A method as in claim 14, further comprising:
querying a call center using the portable device and facilitating communication between the call center and the user.

17. A method as in claim 14, further comprising:
generating a personalized tour plan including the point of interest and transmitting the tour plan to the user via the portable device.

18. A method as in claim 17, further comprising:
identifying advertisement information based on the point of interest and incorporating the advertisement information in the personalized tour plan presented to the user on the portable device.

19. A method as in claim 17, further comprising:
identifying at least a second point of interest based on the identified information about the identified point of interest,
obtaining information about the second point of interest, and
transmitting the obtained information about the second point of interest to the portable device.

20. A method as in claim 14, further comprising:
gathering information about the user using the portable device,
identifying user preferences using the portable device,
querying multiple information sources from the portable device to identify points of interest related to the user preferences, and
generating tour plans related to the user preferences, the tour plans being provided to the portable device.

21. A system for communicating tourist information, comprising:
a portable device having a position identification mechanism and a communications mechanism, wherein the portable device communicates its position information and direction information between the portable device and a point of interest to a processing center; and
the processing center, wherein the processing center identifies the point of interest, obtains information about the point of interest and communicates the identity of the point of interest and the obtained information to a user.

22. A method for communicating tourist information, comprising:
measuring a position of a portable device and a direction between the portable device and a point of interest using the portable device;
calculating a position of the point of interest based on the position of the portable device and the direction of the point of interest relative to the portable device;
identifying the point of interest based on the calculated position;
identifying information about the point of interest; and
transmitting the identified information about the point of interest to a user via the portable device.

* * * * *